United States Patent
Kiyoura et al.

(10) Patent No.: US 6,563,774 B1
(45) Date of Patent: May 13, 2003

(54) DRIVE APPARATUS FOR OPTICAL RECORDING MEDIUM CAPABLE OF REDUCING RESONANCE

(75) Inventors: Kazuhiro Kiyoura, Kawagoe (JP); Toshiyuki Suzuki, Tendo (JP); Takeshi Matsumoto, Kawagoe (JP); Takehiro Takada, Kawagoe (JP); Hiroshi Kitagawa, Kawagoe (JP); Kazunori Saitoh, Tendo (JP); Hiroyuki Abe, Kawagoe (JP)

(73) Assignees: Pioneer Corporation, Tokyo-to (JP); Tohoku Pioneer Corporation, Yamagata-ken (JP)

( * ) Notice: Subject to any disclaimer, the term of this patent is extended or adjusted under 35 U.S.C. 154(b) by 0 days.

(21) Appl. No.: 09/443,043

(22) Filed: Nov. 18, 1999

(30) Foreign Application Priority Data

Nov. 19, 1998 (JP) .......................... 10-330021

(51) Int. Cl.⁷ .......................................... G11B 19/247
(52) U.S. Cl. ................................................ 369/47.48
(58) Field of Search ........................... 365/44.26, 44.27, 365/44.28, 47.38, 47.39, 47.48, 47.45; 360/73.03

(56) References Cited

U.S. PATENT DOCUMENTS

| | | | | |
|---|---|---|---|---|
| 4,647,828 A | * | 3/1987 | Wachi | 369/47.48 X |
| 4,675,749 A | * | 6/1987 | Banno et al. | 369/47.48 X |
| 5,109,369 A | * | 4/1992 | Maeda et al. | 369/47.48 X |
| 5,163,035 A | * | 11/1992 | Horikiri | 369/47 X |
| 5,495,465 A | * | 2/1996 | Arisaka | 369/47.48 |
| 5,642,342 A | * | 6/1997 | Murata | 369/47.48 X |
| 5,825,732 A | * | 10/1998 | Arataki | 369/47.48 |
| 6,118,742 A | * | 9/2000 | Matsui et al. | 369/47.48 |
| 6,195,321 B1 | * | 2/2001 | Takamine et al. | 369/47.48 X |
| 6,356,523 B1 | * | 3/2002 | Hasebe | 369/47.45 |

* cited by examiner

Primary Examiner—Aristotelis M Psitos
(74) Attorney, Agent, or Firm—Finnegan, Henderson, Farabow, Garrett & Dunner, LLP

(57) ABSTRACT

An apparatus for carrying out a fine servo control and a rough servo control with respect to the rotation of a motor for rotating a recording medium in accordance with information recorded on the recording medium. A fine servo signal is generated on the basis of a reproduction clock, filtered by a first filtering device, and used for the fine servo control. A rough servo signal is generated on the basis of a frame synchronizing signal, filtered by a second filtering device, and used for the rough servo control. The first filtering device has a first frequency band, and the second filtering device has a second frequency band. The upper limit of the second frequency band is lower than that of the first frequency band.

11 Claims, 4 Drawing Sheets

DRIVE APPARATUS FOR OPTICAL RECORDING MEDIUM CAPABLE OF REDUCING RESONANCE

BACKGROUND OF THE INVENTION

1. Field of the Invention

The present invention relates to a drive apparatus for an optical recording medium such as an optical disk, more specifically relates to a drive apparatus for controlling spindle servo by switching it between fine servo by means of a fine servo loop and rough servo by means of a rough servo loop.

2. Description of the Related Art

In a recording/reproducing apparatus for recording and reproducing information onto/from a disk such as CD (Compact disk) or LD (laser disk), rotation of a spindle motor is controlled. This control includes two kinds of systems, i.e., fine servo and rough servo.

For example, in the fine servo on CD, a reproducing clock signal is extracted by a PLL circuit based on a EFM-modulated (Eight to Fourteen Modulation) RF signal, and the reproducing clock signal is compared with a reference clock signal so that a phase error signal and a speed error signal are generated, and driving of the spindle motor is controlled based on these error signals.

The rough servo is a system for extracting a synchronizing signal from an EFM-modulated RF signal and comparing the synchronizing signal with a reference clock signal so as to generate a speed error signal and to control driving of the spindle motor based on the speed error signal.

In a conventional reproducing apparatus for CD or the like, even during reproduction from CD or the like as well as at the time of starting the reproducing apparatus and at the time of a search operation, namely, even in the case where a reproducing clock is not extracted, the rotation is controlled accurately to a certain extent by switching between the fine servo and the rough servo.

However, according to the conventional system, since a ternary-controlled waveform, for example, is inputted directly into the spindle motor in the rough mode, the spindle motor is unnecessarily oscillated by its high frequency component, and thus resonance, which is peculiar to the spindle motor, is caused mainly due to axial resonance. Since this resonance oscillates a disk mainly in a horizontal direction, the oscillation becomes disturbance, and a resonance waveform appears in the tracking error signal waveform. As a result, there is a problem that the stabilization of the tracking servo is prevented.

SUMMARY OF THE INVENTION

It is an object of the present invention to provide a drive apparatus for an optical recording medium which does not resonate a spindle motor at the time of rough servo.

A drive apparatus in accordance with the present invention is an apparatus for controlling a rotation of a motor for rotating a recording medium. The drive apparatus includes a fine servo control device for carrying out a fine control of the rotation of the motor using a reproduction clock, a rough servo control device for carrying out a rough control of the rotation of the motor using a frame synchronizing signal, and a selecting device for selecting one of the fine servo control device and the rough servo control device so as to carry out one of the fine control and rough control.

The fine servo control device includes: a fine servo signal generating device for generating a fine servo signal on the basis of the reproduction clock; and a first filtering device having a first frequency band for allowing first frequency components of the fine servo signal to pass therethrough;

The rough servo control device includes: a rough servo signal generating device for generating a rough servo signal on the basis of the frame synchronizing signal; and a second filtering device having a second frequency band for allowing second frequency components of the rough servo signal to pass therethrough. The upper limit of the second frequency band in the second filtering device is lower than that of the first frequency band in the first filtering device.

In the drive apparatus having such construction, when carrying out the fine servo control, the selecting device selects the fine servo control device. At this time, a reproduction clock is obtained from information recorded on the recording medium. The fine servo signal generating device then generates the fine servo signal on the basis of the reproduction clock. The first filtering device then extracts first frequency components from the fine servo signal. Then, the first frequency components are used for the fine servo control of the rotation of the motor.

The first frequency band in the first filtering device is set so as to extract the first frequency components from the fine servo signal. By extracting only the first frequency components from the fine servo signal, unnecessary high frequency components or noise components can be removed. Therefore, the accurate servo control can be achieved by the fine servo control device.

On the other hand, when carrying out the rough servo control, the selecting device selects the rough servo control. At this time, a frame synchronizing signal is obtained from information recorded on the recording medium. The rough servo signal generating device then generates the rough servo signal on the basis of the frame synchronizing signal. The second filtering device then extracts second frequency components from the rough servo signal. Then, the second frequency components are used for the rough servo control of the rotation of the motor.

The second frequency band in the second filtering device is set so as to extract the second frequency components from the second servo signal. By extracting only the second frequency components from the rough servo signal, unnecessary high frequency components or noise components can be removed. As a result, resonance of the motor due to high frequency components of the rough servo signal is reduced, and the stable servo control can be achieved by the rough servo control device.

Because the second frequency components used for the rough servo control is lower than the first frequency component used for the fine servo control in frequency, the upper limit of the second frequency band in the second filtering device is lower than the upper limit of the first frequency band in the first filtering device. Because the first frequency band and the second frequency band are independently set to the separate filtering devices, respectively, the filtering operation in the fine servo control device and the filtering operation in the rough servo control device are independent from each other. Even if the necessary frequency band for the fine servo control overlaps the unnecessary frequency band for the rough servo control, the necessary frequency component for the fine servo control can be extracted from the fine servo signal, and the unnecessary frequency component for the rough servo control can be removed from the rough servo signal.

As mentioned above, according to the present invention, in the fine servo control, the accurate servo operation can be realized, and the resonance of the motor is reduced in the rough servo control so that the satisfactory servo operation can be realized.

In case where a CD, a CD-R, a CD-R/W, a DVD, a DVD-RAM, a DVD-ROM or the like is used as the recording medium, it is preferable that the upper limit of the first frequency band is lower than 1000 Hz, and the upper limit of the second frequency band is lower than 500 Hz.

In the above-mentioned drive apparatus, the selecting device may select the fine servo control device at least when decoding information recorded on the recording medium so as to reproduce the decoded information, and the selecting device may select the rough servo control device at least when carrying out a search operation, a track jump operation or a starting operation of the apparatus. Thus, both the accurate reproduction of the decoded information and the stable search operation (the track jump operation or the starting operation) can be achieved.

In the above-mentioned drive apparatus, the fine servo control device may be provided as a loop circuit including the fine servo signal generating device and the first filtering device. Also, the rough servo control device may be provided as a loop circuit including the rough servo signal generating device and the second filtering device.

In the above-mentioned drive apparatus, the first filtering device may include a first low pass filter having a first cut-off frequency, and the second filtering device comprises a second low pass filter having a second cut-off frequency, and the second cut-off frequency is lower than the first cut-off frequency.

In the above-mentioned drive apparatus, the fine servo signal generating device may include: a first reference clock generating device for generating a first reference clock; and a first difference detecting device for detecting a difference in frequency between the reproduction clock and the first reference clock and generating the fine servo signal indicating the difference in frequency between the reproduction clock and the first reference clock. Furthermore, the rough servo signal generating device may include: a second reference clock generating device for generating a second reference clock; and a second difference detecting device for detecting a difference in frequency between the frame synchronizing signal and the second reference clock and generating the rough servo signal indicating the difference in frequency between the frame synchronizing signal and the second reference clock.

The nature, utility, and further feature of this invention will be more clearly apparent from the following detailed description with respect to preferred embodiments of the invention when read in conjunction with the accompanying drawings briefly described below.

DETAILED DESCRIPTION OF THE PREFERRED EMBODIMENTS

There will be described below a preferred embodiment of the present invention with reference to the diagrams.

The present invention is applied to a CD drive apparatus for a car in the following present embodiment. The CD drive apparatus has a function for, when a spindle motor is in rough servo, eliminating a high-frequency component from a ternary-controlled error signal, for example, by means of a low-pass filter and reducing resonance of the spindle motor.

Figure 1:
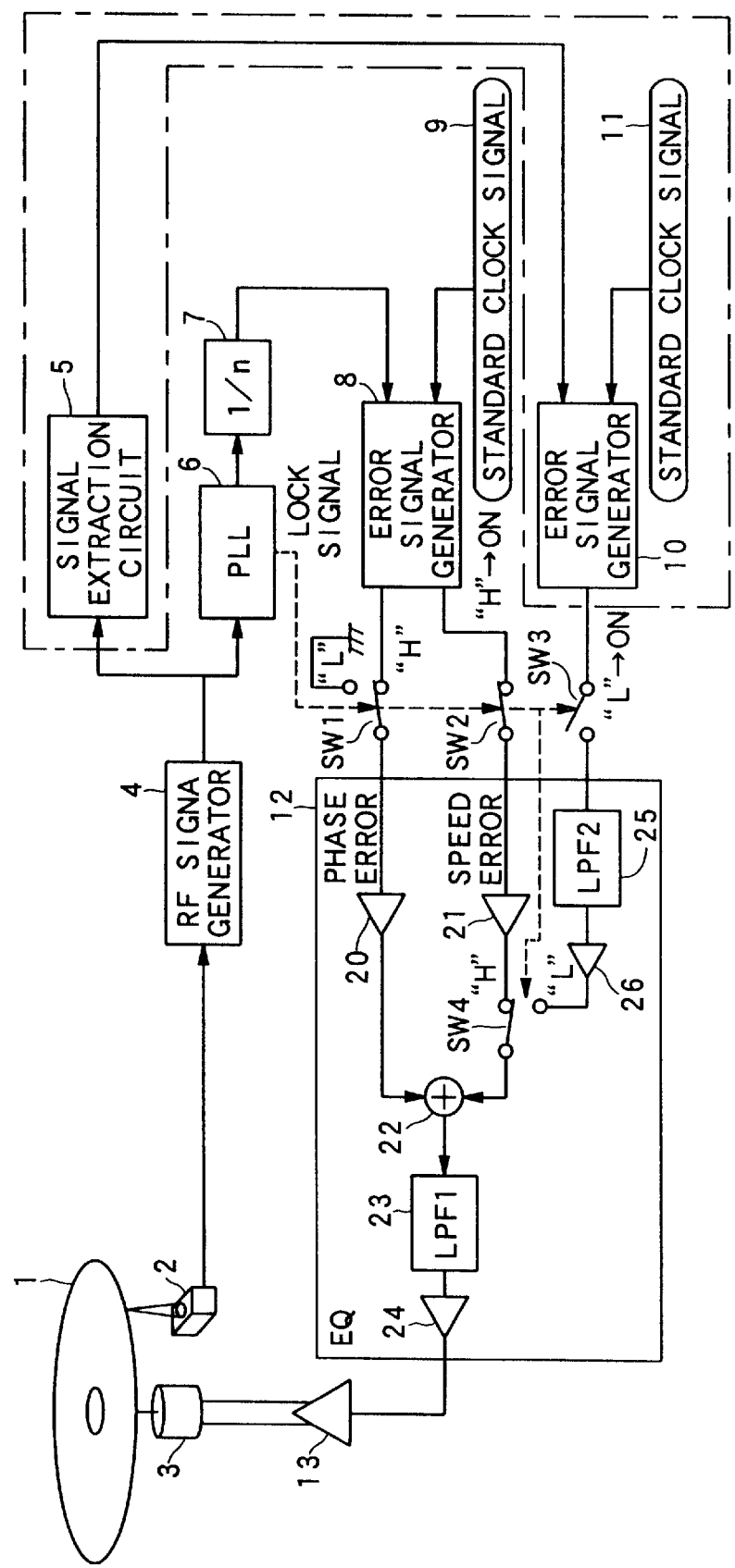
FIG. 1 is a block diagram showing a structure of a CD drive apparatus for a car according to one embodiment of the present invention.

FIG. 1 shows a structure of the CD drive apparatus according to the present embodiment.

In FIG. 1, the CD drive apparatus according to the present embodiment has: a disk 1 as an optical recording medium onto which a signal was recorded; a pick-up 2 for reading the recorded signal from an information track of the disk 1 through a lens (not shown); a spindle motor 3 for rotating the disk 1; an RF signal generator 4 for amplifying the signal read by the pick-up 2 so as to EFM-modulate the RF signal; a signal extraction circuit 5 for extracting a frame synchronizing signal as a synchronizing signal from the EFM-modulated RF signal; a PLL circuit 6 having an oscillator (VCO) for synchronizing an output of the oscillator with the EFM-modulated RF signal so as to extract a reproducing clock signal; a divider 7 for dividing the reproducing clock signal outputted from the PLL circuit 6; a first error signal generator 8 for comparing the divided reproducing clock signals with a reference clock signal so as to generate a phase error and speed error signals; a first reference clock signal generator 9 for dividing a master clock, not shown, so as to generate a first reference clock; a second error signal generator 10 for comparing the output from the signal extraction circuit 5 with the reference clock signal so as to generate a speed error signal; a second reference clock signal generator 11 for dividing a master clock, not shown, so as to generate a second reference clock; an equalizer 12 for shaping the error signal outputted from the first error signal generator 8 or the second error signal generator 10 so as to bring out the performance of servo; and a driver 13 for outputting the output from the equalizer 12 as a signal which is capable of driving the motor.

Here, in FIG. 1, the description about a flow of an audio signal modulation is omitted. However, an RF signal, which was EFM-modulated by the RF generator 4 and error-correction coded by CIRC, is generated as a 16-bit digital signal which was EFM-modulated by a signal processor, not shown, and was error-correction decoded, and the 16-bit digital signal is converted into an analog signal by a D/A converter, not shown. Thereafter, the analog signal is allowed to pass an audible frequency zone by the low-pass filter, and a noise portion is eliminated so that an audio signal can be obtained.

In the CD drive apparatus shown in FIG. 1, a fine servo loop for executing fine servo is composed of the disk 1, the pick-up 2, the RF generator 4, the PLL circuit 6, the divider 7, the first error signal generator 8, the equalizer 12, the driver 13 and the spindle motor 3. A rough servo loop for executing rough servo is composed of the disk 1, the pick-up 2, the RF generator 4, the signal extraction circuit 5, the second error signal generator 10, the equalizer 12, the driver 13 and the spindle motor 3.

Further, the CD driver apparatus has switches SW1, SW2 and SW3 as switching means among the first error signal generator 8, the second error signal generator 10 and the equalizer 12. The switches SW1 and SW2 are in closed state when a lock signal outputted from the PLL circuit 6 is high level. As a result, the fine servo loop is formed. At this time, the fine servo is executed. The switch SW3 is in the opened state when the lock signal outputted from the PLL circuit 6 is low level so that the rough servo loop is formed. At this time, the rough servo loop is formed.

In addition, the signal (information) to be reproduced is recorded on the disk 1 as a bit sequence. When the reproduction of the information is carried out, the bit sequence is read as the reading signal by the pick-up 2. In the bit sequence, the bit intervals are uniform and are predetermined. On the basis of these uniform bit intervals, the frequency of the reproduction clock is determined. Furthermore, the bit sequence is divided into plural frames on the recording medium. Each frame has the same length and a short bit sequence indicating a synchronization pattern is placed at the lead part of each frame. Because each frame has the same length, the short bit sequences are located at equal intervals. On the basis of the short bit sequences, the frame synchronizing signal is generated.

There will be described below operations of the fine servo and rough servo in the CD drive apparatus according to the present embodiment.

At first, when a normal reproducing operation is performed on CD, the fine servo is executed. The oscillator (VCO) which is capable of controlling an oscillation frequency by means of a voltage is provided in the PLL circuit 6, and the PLL circuit 6 controls the oscillator so as to synchronize the EFM-modulated RF signal outputted from the RF generator 4 with an output signal of the internal oscillator and obtain a predetermined reproducing clock signal. When the synchronization is realized, a high-level clock signal is outputted from the PLL circuit 6, and the switches SW1 and SW2 are closed.

On the other hand, the reproducing clock signal outputted from the PLL circuit 6 is divided into 1/n by the divider 7, and supplied to the first error signal generator 8 so as to be compared with a reference clock signal outputted from the reference clock signal generator 9 in the first error signal generator 8. Delay in phase of the reproducing clock signal from the reference clock signal is supplied as a phase error signal to the equalizer 12 via the switch SW1, and delay in frequency of the reproducing clock signal from the reference clock signal is supplied as a speed error signal to the equalizer 12 via the switch SW2.

Figure 2:
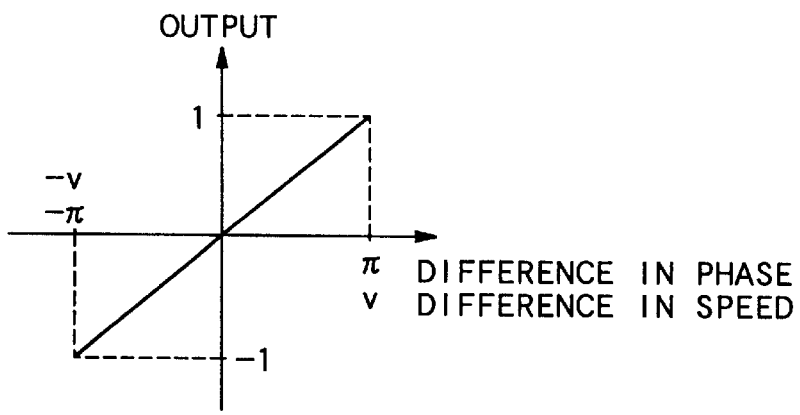
FIG. 2 is a diagram showing a phase error signal and a speed error signal which are outputted from a first error signal generator in a fine servo loop in the CD drive apparatus shown in FIG. 1.

Examples of the phase error signal and the speed error signal outputted from the first error signal generator are shown in FIG. 2. As shown in FIG. 2, the phase error signal and the speed error signal become signals which are outputted in proportion to a difference in phase (rad) or a difference in speed (v).

The equalizer 12 has amplifiers 20 and 21, an adder 22, a first low-pass filter 23 and an amplifier 24. The phase error signal and the speed error signal supplied via the switches SW1 and SW2 are added to each other by the adder 22 via the amplifiers 20 and 21 so as to be supplied to the first low-pass filter 23. Here, an input of the adder 22 is connected with one of the amplifiers 21 and an amplifier 26 by a switch SW4. When the lock signal is high level, the adder 22 is connected with the amplifier 21, and thus the speed error signal is supplied to the adder 22 via the amplifier 21.

The first low-pass filter 23 whose cut-off frequency is set to a several hundreds Hz (for example, 500 to 1000 Hz, preferably, 500 to 700 Hz) extracts a frequency component suitable for the spindle servo. The signal extracted in such a manner is outputted to the driver 13 via the amplifier 24. The driver 13 outputs the output signal from the equalizer 12 as a signal which is capable of driving the spindle motor 3. As a result, the rotation of the spindle motor 3 is controlled so that the delay in phase and delay in speed are corrected.

The velocity of the CD is controlled constantly and accurately within a range of 200 to 500 rpm by the fine servo in the fine servo loop, and the satisfactory reproducing operation is performed.

There will be described below the rough servo. As mentioned above, the rough servo is executed when the lock signal outputted from the PLL circuit 6 becomes low level. For example, at the time of starting the apparatus, during a search operation, during a track jump operation, or during a leading-in process to the normal spindle servo just before the reproducing operation, the lock signal is switched into low level, and the switches SW1 and SW2 are opened and the switch SW3 is closed. As a result, the output of the second error signal generator 10 is supplied to the equalizer 12 via the switch SW3.

The signal supplied to the second error signal generator 10 is a frame synchronizing signal which was extracted by the signal extraction circuit 5. A synchronizing signal is included in each frame of the EFM-modulated RF signal outputted from the RF generator 4, and the signal extraction circuit 5 extracts only the synchronizing signal from the EFM-modulated RF signal, and extracts a frame synchronizing signal having a square shaped waveform by comparison with a predetermined threshold value.

In the second error signal generator 10, the frame synchronizing signal is compared with the reference clock signal outputted from the reference clock signal generator 11, and delay in frequency of the frame synchronizing signal from the reference clock signal is supplied as a speed error signal to the equalizer 12 via the switch SW3.

Figure 3:
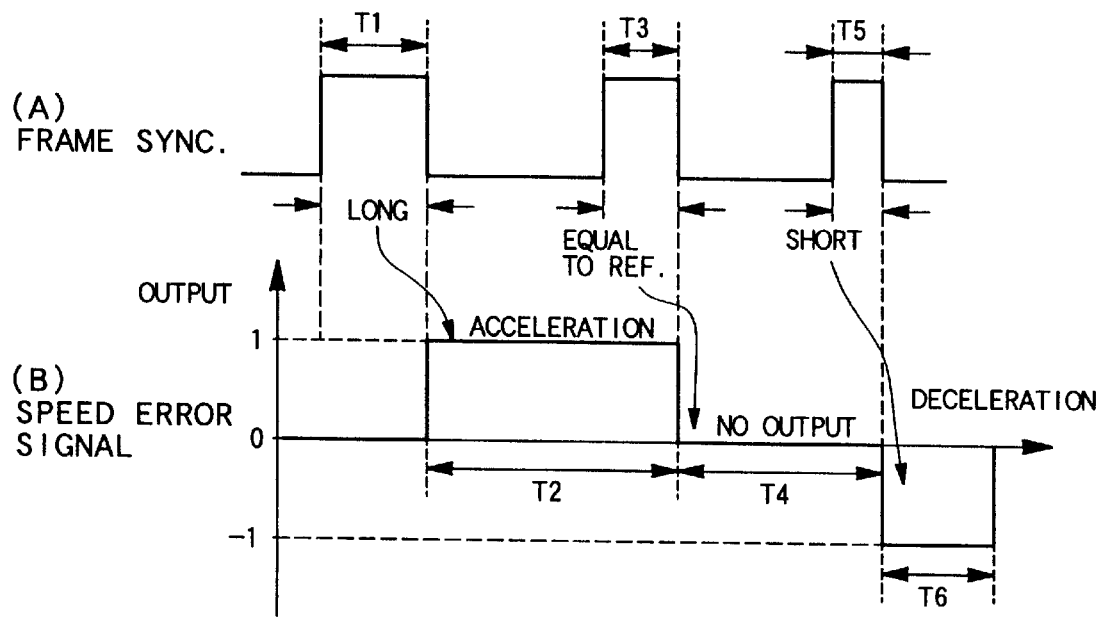
FIG. 3 is a diagram showing an operation for generating a speed error signal outputted from a second error signal generator in the rough servo loop in the CD drive apparatus shown in FIG. 1.

At this time, the speed error signal outputted from the second error signal generator 10, as shown in FIG. 3(B), becomes a ternary controlled signal. For example, as shown in FIG. 3(A), in the case where a pulse width T1 of the frame synchronizing signal is longer than a pulse width of the reference clock, as shown in FIG. 3(B), an accelerating pulse signal of pulse width T2 is outputted. Moreover, when a period T3 is a pulse width which is equal with the pulse width of the reference clock, the output becomes zero. Further, since a pulse width T5 is shorter than the pulse width of the reference clock signal, a reduced speed pulse of pulse width T6 is outputted.

The equalizer 12 has the amplifiers 20 and 21, the adder 22, the first low-pass filter 23 and the amplifier 24 as well as a second low-pass filter 25 and an amplifier 26 shown in FIG. 1. The ternary controlled speed error signal supplied via the switch SW3 is supplied to the second low-pass filter 25.

A cut-off frequency of the second low-pass filter 25 is set to several dozens to several hundreds Hz (for example, 20 to 500 Hz, preferably, 20 to 200 Hz). The second low-pass filter 25 cuts a high-frequency component of the ternary controlled speed error signal shown in FIG. 4(A), and outputs a speed error signal shown in FIG. 4(B) which changes comparatively gradually.

The speed error signal is supplied to the adder 22 via the switch SW4 which is switched to the amplifier 26 side by the lock signal switched to low level. At this time, since the switch SW1 is opened, the signal is supplied to the first low-pass filter 23 without performing the signal adding operation. Since the cut-off frequency is set to several hundreds Hz in the first low-pass filter 23 as mentioned above, the signal which passed through the second low-pass filter 25 directly passes through the first low-pass filter 23 so as to be supplied to the driver 13 via the amplifier 24.

Figure 4:
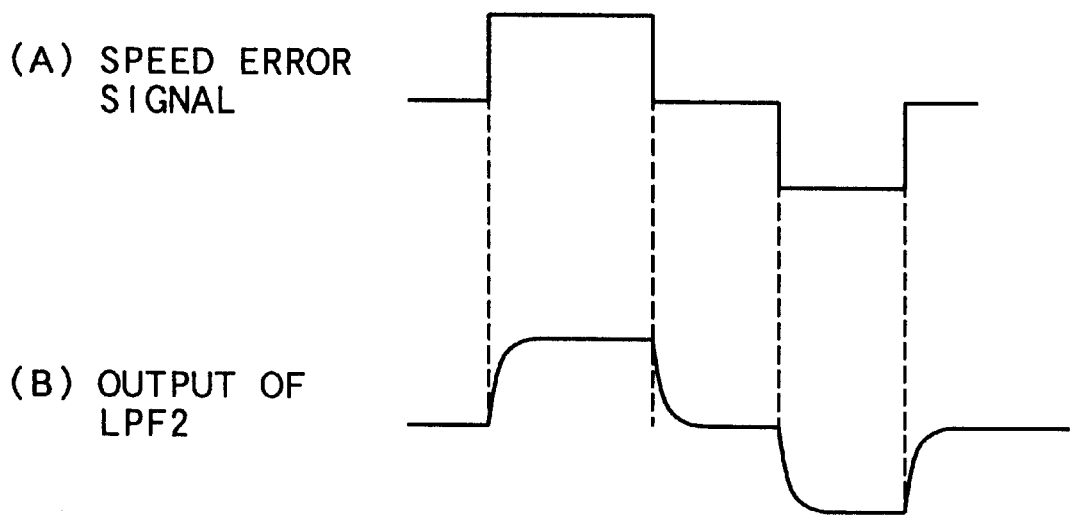
FIG. 4 is a diagram showing a ternary-controlled speed error signal before being inputted into a second low-pass filter and a ternary-controlled speed error signal which passes through the second low-pass filter so as to be amplified by an amplifier in the rough servo loop in the CD drive apparatus shown in FIG. 1.

Therefore, the ternary controlled speed error signal, whose high-frequency component is eliminated and which changes comparatively gradually, is supplied to the driver 13 as shown in FIG. 4(B). For this reason, the resonance of the spindle motor 3 can be reduced more greatly than the conventional apparatus, and thus oscillation of the disk 1 can be reduced greatly. Therefore, generation of a resonance waveform in the tracking error signal can be reduced greatly, and thus accurate tracking jump control or tracking servo control is made.

The present embodiment described the example that the switch SW4 is provided between the amplifier 21 and the adder 22, but since the second low-pass filter 25 has a cut-off frequency lower than that of the first low-pass filter 23, the switch SW4 may be provided between the first low-pass filter 23 and the amplifier 24.

Figure 5:
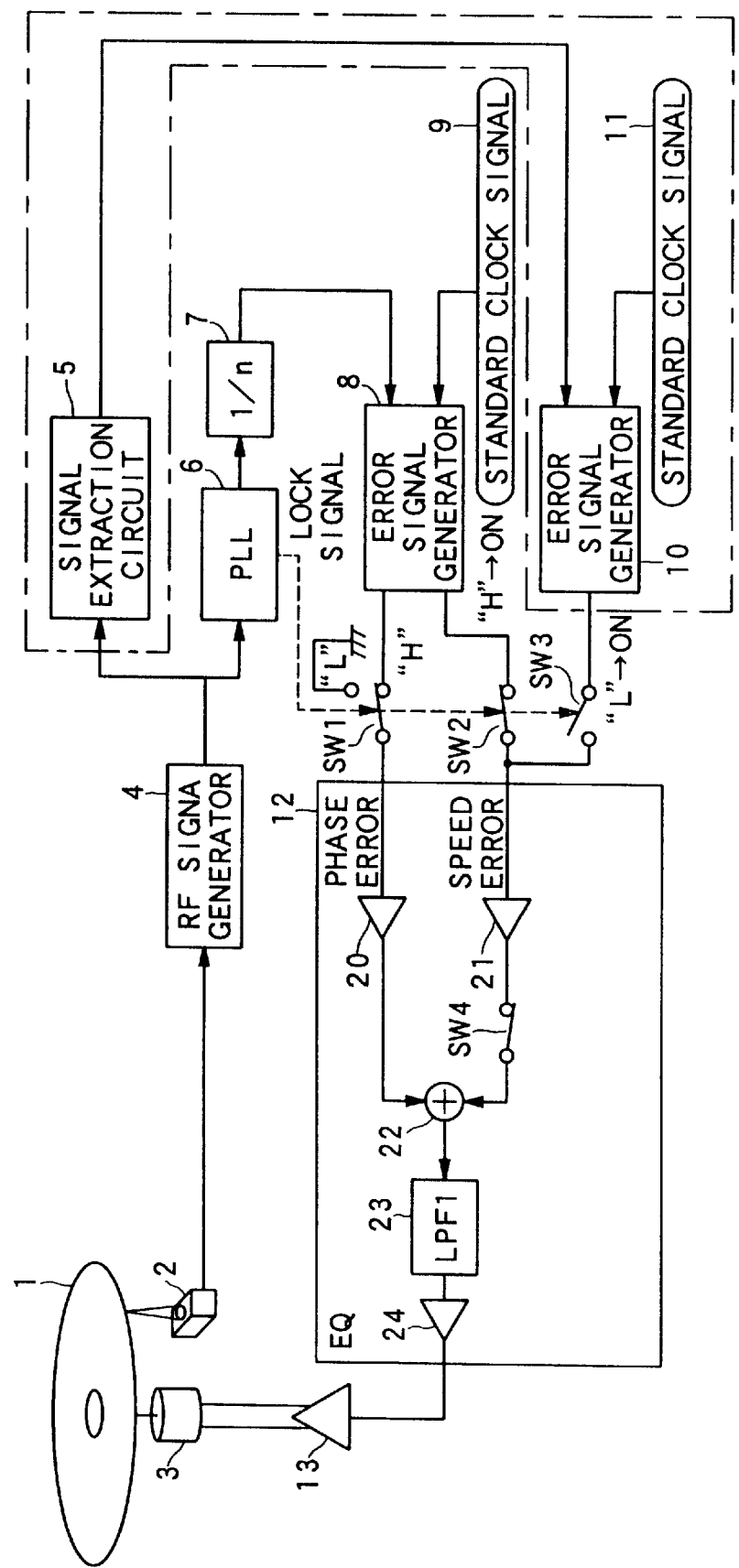
FIG. 5 is a diagram showing a schematic structure of a conventional CD drive apparatus.

The above-mentioned effect of the present invention can be clarified further by comparison with the conventional apparatus. FIG. 5 is a block diagram showing a structure of the conventional drive apparatus. Here, the same reference numerals are given to the parts identical to those in the drive apparatus of the present invention shown in FIG. 1, and the description thereof is omitted.

As shown in FIG. 5, since in the conventional drive apparatus, the equalizer 12 is not provided with the second low-pass filter 25, the amplifier 26 and the switch SW4, the ternary controlled speed error signal shown in FIG. 4(A) outputted from the second error signal generator 10 is supplied directly to the driver 13 via the amplifier 21, the low-pass filter 23 and the amplifier 24 at the time of the rough servo. As a result, the high-frequency component included in the ternary controlled speed error signal causes unnecessary oscillation of the spindle motor 3, and the shaft of the spindle motor 3 is resonated, and thus the resonance peculiar to the spindle motor 3 is caused.

Since the resonance oscillates the disk 1 mainly in the horizontal direction, its signal becomes disturbance and it appears as a resonance waveform in the waveform of the tracking error signal. As a result, there is a problem that a bad influence is exerted on the track jump control or tracking servo control.

Also in the conventional drive apparatus, the equalizer 12 is provided with the low-pass filter 23, but the low-pass filter 23 is set so as to have a cut-off frequency of several hundreds Hz in order to obtain general property required for constant speed control of the spindle motor 3. As a result, the high-frequency component included in the signal shown in FIG. 4(A) cannot be eliminated, and thus the above-mentioned resonance of the spindle motor 3 cannot be prevented.

In addition, in order to prevent the resonance of the spindle motor 3, a low-pass filter, which sets the cut-off frequency of the ternary controlled speed error signal within the range of several dozens Hz to several hundred Hz, is required, but if such a low-pass filter is provided in the position of the first low-pass filter 23, satisfactory servo property cannot be obtained.

On the contrary, in the drive apparatus of the present embodiment, as mentioned above, the equalizer 12 has the first low-pass filter 23 having a cut-off frequency of several hundreds Hz and the second low-pass filter 25 having a cut-off frequency of several dozens to several hundreds Hz. At the time of the fine servo, the first low-pass filter 23 having the cut-off frequency of several hundreds Hz is used to make the servo control so that the satisfactory servo property can be obtained. Moreover, at the time of rough servo, the second low-pass filter 25 having the cut-off frequency of several dozens to several hundreds Hz is used so as to make the servo control, and the occurrence of the resonance of the spindle motor 3 can be reduced greatly.

Herein, the present invention is effective in the case that a motor With a brush is used as the spindle motor and also in the case that a motor without a brush is used.

In addition, the present embodiment described the example that the ternary controlled signal is used as the error signal outputted from the second error signal generator 10 at the time of rough servo, but the present invention is not limited to such a structure, and thus it is effective in another multi-value controlled signal.

In addition, the drive apparatus of the present embodiment is the example that the present invention is applied to a single-speed drive apparatus, but the present invention is not limited to such a structure. For example, in a n-speed drive apparatus, a frequency of the speed error signal outputted from the second error signal generator becomes high, and thus the cut-off frequency of the second low-pass filter 25 may be set to the same value as the frequency in the above-mentioned embodiment, or to a suitably higher frequency according to the frequency of the speed error signal.

In addition, the drive apparatus of the present embodiment is the example that the present invention is applied to a CD drive apparatus, but the present invention is not limited to this, and thus can be applied to drive apparatuses for CD-ROM, CD-R, CD-R/W, DVD, DVD-RAM and DVD-ROM.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 10-330021 filed on Nov. 19, 1998 including the specification, claims, drawings and summary is incorporated herein by reference in its entirety.

What is claimed is:

1. An apparatus for controlling a rotation of a motor for rotating a recording medium, comprising a fine servo control device for carrying out a fine control of the rotation of the motor using a reproduction clock, a rough servo control device for carrying out a rough control of the rotation of the motor using a frame synchronizing signal, and selecting device for selecting one of the fine servo control device and the rough servo control device so as to carry out one of the fine control and rough control, wherein:

the fine servo control device comprises:
a fine servo signal generating device for generating a fine servo signal on the basis of the reproduction clock, and
a first filtering device having a first frequency band for allowing first frequency components of the fine servo signal to pass therethrough, the rough servo control device comprises:
   a rough servo signal generating device for generating a rough servo signal on the basis of the frame synchronizing signal, and
   a second filtering device having a second frequency band for allowing second frequency components of the rough servo signal to pass therethrough, and
   an upper limit of the second frequency band in the second filtering device is lower than an upper limit of the first frequency band in the first filtering device; and
wherein the upper limit of the first frequency band is lower than 1000 Hz, and the upper limit of the second frequency band is lower than 500 Hz.

2. The apparatus according to claim 1, wherein the second frequency components are lower than the first frequency components in frequency.

3. The apparatus according to claim 1, wherein the selecting device selects the fine servo control device at least when decoding information recorded on the recording medium so as to reproduce the decoded information, and the selecting device selects the rough servo control device at least when carrying out a search operating, a track jump operation or a starting of the apparatus.

4. The apparatus according to claim 1, wherein the fine servo control device is a loop circuit including the fine servo signal generating device and the first filtering device, and the rough servo control device is a loop circuit including the rough servo signal generating device and the second filtering device.

5. The apparatus according to claim 1, wherein the first filtering device comprises a first low pass filter having a first cut-off frequency, the second filtering device comprises a second low pass filter having a second cut-off frequency, and the second cut-off frequency is lower than the first cut-off frequency.

6. The apparatus according to claim 1, wherein the fine servo signal generating device comprises:
   a first reference clock generating device for generating a first reference clock; and
   first difference detecting device for detecting a difference in frequency between the reproduction clock and the first reference clock and generating the fine servo signal indicating the difference in frequency between the reproduction clock and the first reference clock, and
the rough servo signal generating device comprises:
   a second reference clock generating device for generating a second reference clock; and
   a second difference detecting device for detecting a difference in frequency between the frame synchronizing signal and the second reference clock and generating the rough servo signal indicating the difference in frequency between the frame synchronizing signal and the second reference clock.

7. The apparatus according to claim 6, wherein the second filtering device restricts a resonance to a spindle motor.

8. The apparatus according to claim 1, wherein the second filtering device restricts a resonance to a spindle motor.

9. An apparatus for controlling a rotation of a motor for rotating a recording medium, comprising a fine servo control device for carrying out a fine control of the rotation of the motor using a reproduction clock, a rough servo control device for carrying out a rough control of the rotation of the motor using a frame synchronizing signal, and selecting device for selecting one of the fine servo control device and the rough servo control device so as to carry out one of the fine control and rough control, wherein:
   the fine servo control device comprises:
      a fine servo signal generating device for generating a fine servo signal on the basis of the reproduction clock, and
      a first filtering device having a first frequency band for allowing first frequency components of the fine servo signal to pass therethrough,
   the rough servo control device comprises:
      a rough servo signal generating device for generating a rough servo signal on the basis of the frame synchronizing signal, and
      a second filtering device having a second frequency band for allowing second frequency components of the rough servo signal to pass therethrough, and
   wherein an upper limit of the second frequency band in the second filtering device is lower than an upper limit of the first frequency band in the first filtering device, wherein the second filtering device functions without passing through the fine servo signal.

10. An apparatus for controlling a rotation of a motor for rotating a recording medium, comprising a fine servo control device for carrying out a fine control of the rotation of the motor using a reproduction clock, a rough servo control device for carrying out a rough control of the rotation of the motor using a frame synchronizing signal, and selecting device for selecting one of the fine servo control device and the rough servo control device so as to carry out one of the fine control and rough control, wherein:
   the fine servo control device comprises:
      a fine servo signal generating device for generating a fine servo signal on the basis of the reproduction clock, and
      a first filtering device having a first frequency band for allowing first frequency components of the fine servo signal to pass therethrough,
   the rough servo control device comprises:
      a rough servo signal generating device for generating a rough servo signal on the basis of the frame synchronizing signal, and
      a second filtering device having a second frequency band for allowing second frequency components of the rough servo signal to pass therethrough, and
      an upper limit of the second frequency band in the second filtering device is lower than an upper limit of the first frequency band in the first filtering device;
   wherein the fine servo signal generating device comprises:
      a first reference clock generating device for generating a first reference clock; and
      a first difference detecting device for detecting a difference in frequency between the reproduction clock and the first reference clock and generating the fine servo signal indicating the difference in frequency between the reproduction clock and the first reference clock, and
   the rough servo signal generating device comprises:
      a second reference clock generating device for generating a second reference clock; and
      a second difference detecting device for detecting a difference in frequency between the frame synchronizing signal and the second reference clock and generating the rough servo signal indicating the difference in frequency between the frame synchronizing signal and the second reference clock; and
   wherein the second filtering device functions without passing through the fine servo signal.

11. The apparatus according to claim 10, wherein the second filtering device restricts a resonance to a spindle motor.

* * * * *